US010435322B2

(12) United States Patent
Dalstra

(10) Patent No.: US 10,435,322 B2
(45) Date of Patent: Oct. 8, 2019

(54) METHOD OF FILLING A MOULD AND SYSTEM FOR FILLING A MOULD

(71) Applicant: Centrum Voor Technische Informatica B.V., Groningen (NL)

(72) Inventor: Joop Dalstra, Haren (NL)

(73) Assignee: Centrum Voor Technische Informatica B. V., Groningen (NL)

( * ) Notice: Subject to any disclaimer, the term of this patent is extended or adjusted under 35 U.S.C. 154(b) by 0 days.

(21) Appl. No.: 15/647,943

(22) Filed: Jul. 12, 2017

(65) Prior Publication Data

US 2018/0065878 A1    Mar. 8, 2018

Related U.S. Application Data

(62) Division of application No. 13/125,082, filed as application No. PCT/NL2008/050660 on Oct. 21, 2008, now Pat. No. 9,731,991.

(51) Int. Cl.
*C03B 7/16* (2006.01)
*C03B 7/00* (2006.01)

(52) U.S. Cl.
CPC ............... *C03B 7/16* (2013.01); *C03B 7/005* (2013.01)

(58) Field of Classification Search
CPC .... C03B 7/08; C03B 7/14; C03B 7/16; C03B 7/005
See application file for complete search history.

(56) References Cited

U.S. PATENT DOCUMENTS

| 3,988,139 | A | * | 10/1976 | Goodwin | C03B 7/16 65/162 |
| 4,165,975 | A | * | 8/1979 | Kwiatkowski | G01G 9/00 177/1 |
| 4,205,973 | A | * | 6/1980 | Ryan | C03B 7/005 65/29.1 |
| 4,526,600 | A | * | 7/1985 | Myers | C03B 7/14 65/24 |
| 4,566,894 | A | * | 1/1986 | Kulig | C03B 9/195 65/225 |
| 4,708,727 | A | * | 11/1987 | Cardenas-Franco | C03B 7/10 65/160 |
| 4,708,729 | A | * | 11/1987 | Cardenas-Franco | G01G 17/00 65/162 |
| 4,772,306 | A | * | 9/1988 | Davey | C03B 7/16 65/225 |
| 5,135,559 | A | * | 8/1992 | Sasso | C03B 7/16 65/158 |

(Continued)

*Primary Examiner* — Jason L Lazorcik
(74) *Attorney, Agent, or Firm* — Patterson Intellectual Property Law, P.C.; Emily A. Shouse; Grant M. Ford

(57) ABSTRACT

Method of filling a mold with a glass gob through an opening of the mold, for forming a glass product in the mold, by using a delivery system for delivering the glass gob to the opening of the mold. The delivery system has an inlet, an outlet, and guiding means for guiding the glass gob through the delivery system. The method includes observing the glass gob, at at least one moment and/or during at least one period after the glass gob has passed the inlet of the delivery system, by using an optical imaging device. The method includes determining a glass gob observation result that includes a glass gob velocity, for predicting a glass distribution of the glass product formed in the mold and/or for controlling a next glass gob.

16 Claims, 8 Drawing Sheets

(56) References Cited

U.S. PATENT DOCUMENTS

| | | | | |
|---|---|---|---|---|
| 5,213,602 | A | * | 5/1993 | Foster .................... C03B 7/16 65/225 |
| 5,254,150 | A | * | 10/1993 | Riemer .................. C03B 7/16 65/225 |
| 5,298,049 | A | * | 3/1994 | Meyer ................... C03B 7/16 193/15 |
| 5,434,616 | A | * | 7/1995 | Anger ................... C03B 7/005 348/135 |
| 5,499,055 | A | * | 3/1996 | Anger ................... C03B 7/005 348/135 |
| 5,562,747 | A | * | 10/1996 | Steffan .................. C03B 7/16 65/122 |
| 5,746,798 | A | * | 5/1998 | Menzie .................. C03B 7/14 34/364 |
| 2004/0194506 | A1 | * | 10/2004 | Ueda ..................... C03B 7/005 65/29.11 |
| 2013/0000359 | A1 | * | 1/2013 | Matsumoto ........... C03B 7/005 65/158 |
| 2016/0257594 | A1 | * | 9/2016 | Johnston ............... C03B 7/005 |

* cited by examiner

METHOD OF FILLING A MOULD AND SYSTEM FOR FILLING A MOULD

CROSS-REFERENCES TO RELATED APPLICATIONS

This application is a divisional of U.S. patent application Ser. No. 13/125,082 having a filing date of Oct. 21, 2008 and which is a 371 of PCT/NL2008/050660 filed Oct. 21, 2008.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The invention relates to a method of filling a mould with a glass gob through an opening of the mould, for forming a glass product in the mould, by using a delivery system for delivering the glass gob to the opening of the mould, the delivery system having an inlet, an outlet, and guiding means for guiding the glass gob through the delivery system, the method including the steps: a) depositing the glass gob in the inlet of the delivery system; b) guiding the glass gob by using the guiding means towards the outlet of the delivery system; c) depositing the glass gob from the outlet of the delivery system in the opening of the mould. The invention also relates to a system comprising an optical imaging device, a signal processing unit coupled to the imaging device, and an apparatus for filling a mould with a glass gob through an opening of the mould, for forming a glass product in the mould, the apparatus having a delivery system for delivering the glass gob to the opening of the mould, the delivery system having an inlet, an outlet, and guiding means for guiding the glass gob through the delivery system towards the outlet of the delivery system.

BRIEF SUMMARY OF THE INVENTION

Glass gobs are used for manufacturing glass products such as bottles. Glass gobs are usually formed from a glass reservoir, and subsequently guided to the mould by means of the guiding structure. In practical application of a glass product manufacturing process, it accidentally happens that bottles are misshaped or are otherwise unacceptable, resulting from erroneous filling of the mould. In such a situation, the production process has to be adjusted, which may even require stopping of the production process. A cause for the erroneous filling is often unclear, so that adjusting the production process takes place by trial and error. Such a way of process control is inefficient and can be rather costly.

Accordingly, it is an object of the invention to provide a method for filling a mould with a glass gob that enables improved process control.

Thereto the invention provides a method of filling a mould with a glass gob through an opening of the mould, for forming a glass product in the mould, by using a delivery system for delivering the glass gob to the opening of the mould, the delivery system having an inlet, an outlet, and guiding means for guiding the glass gob through the delivery system, the method including the steps: a) depositing the glass gob in the inlet of the delivery system; b) guiding the glass gob by using the guiding means towards the outlet of the delivery system; c) depositing the glass gob from the outlet of the delivery system in the opening of the mould; d) observing the glass gob, at at least one moment and/or during at least one period after the glass gob has passed the inlet of the delivery system, by using an optical imaging device, and e) determining, based on the observing in step d), a glass gob observation result that includes a glass gob velocity, for predicting, based on at least the glass gob velocity of the glass gob observation result, a glass distribution of the glass product formed in the mould, and/or for controlling, based on at least the glass gob velocity of the glass gob observation result, depositing as in step a), guiding as in step b), and/or depositing as in step c), of a next glass gob that is formed later than the glass gob. Preferably, the glass gob velocity includes a magnitude of the glass gob velocity and/or a direction of the glass gob velocity. Preferably, the glass distribution includes an internal structure and/or an external shape of the glass product formed in the mould. The internal structure may refer to inclusions within glass material of the glass product. The external shape may refer to, at various locations along the glass product, length dimensions of the glass product, such as an inner diameter and an outer diameter of the glass product. It was recognized by the inventor that minimizing loss of glass gob velocity when the glass gob travels through the delivery system, is important for forming a correctly shaped and/or correctly structured glass product in the mould. If the magnitude of the glass gob velocity is too low, the glass gob may not be able to travel far enough into the mould. As a result, the external shape of the glass product may deviate from the predetermined external shape. The predetermined external shape for example is a shape of a surface of the glass product within normal manufacturing specifications. If the direction of the glass gob velocity is not directed centrally into the mould opening, friction between the glass gob and an inner wall of the mould may become too large for part of the glass gob. As a result, gas may be included in that part of the glass product, for example in the form of gas bubbles. Such gas inclusion may for example result from entrapped air, or from evaporated entrapped lubricant of the mould. Gas inclusion in general is unwanted, as it may decrease a strength of the glass product. If the friction is too large, the degree of inclusion of gas in the glass product may be too large. The degree of inclusion of gas is an example of the internal structure of the glass product. The inventor realized that the friction being too large may also lead to asymmetric heat loss of the glass gob in the mould, which may result in an asymmetric viscosity of the material of the glass gob and as a result to an asymmetric external shape of the glass product. The degree of inclusion of gas in the glass product and the deviation of the shape of the glass product from the predetermined shape are examples of important quality parameters for the glass product. As the glass gob velocity thus is an important variable, determining the glass gob velocity for predicting the glass distribution and/or for controlling a process step of the next glass gob, enables improved process control.

Preferably, step e) includes predicting, based on at least the glass gob velocity of the glass gob observation result, a glass distribution of the glass product formed in the mould, and/or controlling, based on at least the glass gob velocity of the glass gob observation result, depositing as in step a), guiding as in step b), and/or depositing as in step c), of a next glass gob that is formed later than the glass gob.

Predicting and/or controlling in step e) may be based on a predetermined relation between the glass gob velocity and the glass distribution of the glass product formed in the mould. Such a predetermined relation may couple different reference glass gob velocities to different forms of the glass distribution, for example to probabilities for obtaining different forms of the glass distribution. By comparing the determined glass gob velocity with the reference velocities, a corresponding probability for obtaining a form of the glass distribution may be identified. A prediction for the glass distribution can then be made, and/or a process step for the next glass gob can be adjusted. In a practical variation of the method, predicting in step e) may be carried out by comparing the magnitude of the glass gob velocity with a limit value, wherein the magnitude of the glass gob velocity should be above the limit value for preventing an undesirable high probability for a misshaped and/or misstructured glass product. In this variation, the predetermined relation may include a range of velocities lower than the limit value, with corresponding thereto an undesirable high probability for a misshaped and/or misstructured glass distribution, and/or a range of velocities larger than the limit velocity, with an acceptable probability for a well-shaped and/or well-structured glass distribution corresponding thereto. The predetermined relation and/or the limit value may be determined by trial and error. Analogously, predicting in step e) may be carried out by comparing the magnitude of the glass gob velocity with another limit value, wherein the magnitude of the glass gob velocity should be below the other limit value for preventing an undesirable high probability for a misshaped and/or misstructured glass product.

Alternatively or additionally, predicting and/or controlling in step e) may be carried out by using a self-learning algorithm, having input and output variables. Such self-learning algorithms as such are known to the skilled person. The velocity and the glass distribution may be used as input variables. A prediction signal and/or a controlling signal may be used as output variables, arranged for respectively predicting and/or controlling in step e). Based on the input signals obtained under influence of earlier output signals, the self-learning algorithm may adapt itself to for example improve determination of a probability for a misshaped and/or misstructured glass distribution. The algorithm may, in use, adapt its parameters if predicted glass distributions deviate from the glass distributions that are actually realized.

In yet another variation, predicting, based on at least the glass gob velocity of the glass gob observation result, the glass distribution of the glass product formed in the mould, as carried out in step e), is interpreted as assessing, based on at least the glass gob velocity of the glass gob observation result, the glass distribution of the glass product formed in the mould.

Step a), b), c), d), and e) may be applied in that order, although this is not necessary.

In an embodiment, predicting the internal structure in step e) includes predicting the degree of inclusion of gas in the glass product and/or predicting the external shape in step e) includes predicting the deviation of the external shape of the glass product from a predetermined external shape. Such predicting may be based on a predetermined relation between the glass gob velocity and the degree of inclusion of gas in the glass product, and/or on a predetermined relation between the glass gob velocity and the deviation of the external shape of the glass product from the predetermined external shape.

Preferably, the glass gob velocity includes the magnitude of the glass gob velocity, and predicting the deviation of the external shape of the glass product from the predetermined external shape is based on the magnitude of the glass gob velocity. If the magnitude of the glass gob velocity is too low, the glass gob may not be able to travel far enough into the mould, so that the shape of the glass product will deviate from the predetermined shape. Preferably, the glass gob velocity includes the direction of the glass gob velocity, and predicting the degree of inclusion of gas in the glass product and/or predicting the external shape of the glass product is based on the direction of the glass gob velocity. If the friction is too large, the degree of inclusion of gas in the glass may be too large, and/or the glass gob may not be able to travel far enough into the mould. The friction being too large may also lead to asymmetric heat loss of the glass gob in the mould, which may result in an asymmetric viscosity of the material of the glass gob and as a result to an asymmetric external shape of the glass product.

Preferably, determining the glass gob velocity in step e) includes determining both the magnitude and the direction of the glass gob velocity. However, determining the magnitude of the glass gob velocity without determining the direction of the glass gob velocity, or determining the direction of the glass gob velocity without determining the magnitude of the glass gob velocity, is also valuable.

Optionally, the magnitude of the glass gob velocity at least includes an arrival time of the glass gob at an observation position after the inlet and optionally after the outlet. Optionally, the direction of the glass gob velocity at least includes a position of the glass gob near the observation position after the inlet and optionally after the outlet. These options, on itself and in combination, represent rather simple but efficient ways of determining the glass gob velocity. However, it may be clear that other ways of determining the glass gob velocity may give a better and more reliable result, for example determining the glass gob velocity, by using the optical imaging device, based on images of one and the same glass gob taken at at least two different times and two different positions of the one and the same glass gob. Therefore, the glass gob velocity may lack the glass gob position and/or the arrival time.

In an embodiment, the glass gob observation result further includes at least one variable of a glass gob trajectory, a glass gob shape, a change in the glass gob shape, a glass gob orientation, and a change in the glass gob orientation, wherein predicting and/or controlling in step e) is further based on the at least one variable. Such a variable, or such variables, additional to the glass gob velocity, enable a better process control. Without negating the usefulness of the other variables, in particular determining the glass gob shape is useful. The shape of the glass gob can change while it falls from the outlet to the opening of the mould, or can change while the glass gob travels along the guiding means. For correct filling of the mould, it is desired that the glass gob has a correct shape when it enters the opening of the mould.

In an embodiment, observing in step d) is carried out at at least one moment and/or during at least one period after the glass gob has, at least partly and optionally completely, passed the outlet of the delivery system. In this way, the glass gob observation result is representative for the distribution process of the glass gob in the mould.

In an embodiment, observing in step d) is carried out at at least one moment and/or during at least one period before the glass gob has, completely and optionally at least partly, entered the opening of the mould. Preferably, observing is carried out with the glass gob being positioned in proximity of the mould, preferably within one, two, or three times a dimension, such as a maximum or minimum diameter, of the glass gob. The maximum diameter may be directed along a longitudinal axis of the glass gob in case the glass gob has an elongated shape, and the minimum diameter may be directed transverse to the longitudinal axis. The closer the glass gob is observed near the mould opening, the more the observation result is representative for the distribution process of the glass gob in the mould.

In an embodiment, observing in step d) is carried out at at least one moment and/or during at least one period after the glass gob has, at least partly, entered the opening of the mould. After entering of the mould, there is a fair chance that the glass gob makes mechanical contact with an inner side of the mould. If the friction of the glass gob with the inner side of the mould is too large, this will result in a decrease in the glass gob velocity. Therefore, determining the glass gob velocity, in particular the magnitude of the glass gob velocity, after the glass gob has entered the opening of the mould enables predicting and/or controlling in step e), based on a direct observation of the filling process in the mould.

In an embodiment, the method includes aligning the optical imaging device with respect to the mould. This enables relating the glass gob observation result, in particular the direction of the glass gob velocity, to a location of the opening of the mould.

In an embodiment, the optical imaging device includes at least two cameras, each camera having an optical axis, wherein observing in step d) is carried out with the optical axes of the at least two cameras having mutually distinct directions, preferably mutually transverse directions. The use of two cameras enables three-dimensional observation in step d), for example observing a three-dimensional glass gob velocity. Preferably, the optical axes of the at least two cameras are directed transverse to a travel path of the glass gob from the outlet to the opening of the mould. In this way, accuracy of the determination of a three-dimensional glass gob velocity is increased.

In an embodiment, the glass gob velocity is a three-dimensional glass gob velocity. This enables a more reliable process control. Preferably, the glass gob velocity includes a three-dimensional direction of the glass gob velocity. This enables determination of a three-dimensional trajectory of the glass gob.

In an embodiment, the glass gob trajectory is a three-dimensional glass gob trajectory, the glass gob shape is a three-dimensional glass gob shape, the change in the glass gob shape is a change in the three-dimensional glass gob shape, the glass gob orientation is a three-dimensional glass gob orientation, and the change in the glass gob orientation is a change in the three-dimensional glass gob orientation.

In an embodiment, the method includes the steps: f) forming the glass gob, by detaching the glass gob from a liquid glass reservoir; and g) using the glass gob observation result for controlling forming the next glass gob that is formed later than the glass gob formed in step f). Forming of the glass gob may be achieved by known methods, such as using shear blades to detach the glass gob from a glass column pushed out of a reservoir of liquid glass. Step f) may be carried out before step a). Step g) may be carried out after carrying out step d), optionally after carrying out step e).

In an embodiment, controlling in step g) is based on at least the glass gob velocity of the glass gob observation result and/or is based on predicting, in step e), the glass distribution of the glass product formed in the mould.

In an embodiment, controlling in step e) is further based on predicting, in step e), the glass distribution of the glass product formed in the mould.

In an embodiment, controlling, in step e), of guiding as in step b) of the next glass gob includes adjusting lubrication of the guiding means. Variation in the glass gob velocity may be related to variation in lubrication of the guiding means. Thus, a decrease in the glass gob velocity may be counteracted by adjusting, in this case increasing, lubrication of the guiding means.

In an embodiment, controlling, in step e), of depositing as in step a) of the next glass gob includes adjusting a mutual position difference of the inlet and a formation position at which the glass gob is formed. Preferably, controlling, in step e), of depositing as in step c) of the next glass gob includes adjusting a mutual position difference of the outlet and the opening of the mould. Adjusting, based on the glass gob observation result, the mutual position difference of the inlet and the formation position at which the glass gob is formed, enables improved process control of depositing the next glass gob in step a). Adjusting, based on the glass gob observation result, the mutual position difference of the outlet and the opening of the mould, enables improved process control of depositing the next glass gob in step c).

In an embodiment, the guiding means include a scoop funnel forming the inlet, a trough, and a deflector funnel forming the outlet, wherein guiding the glass gob in step b) includes guiding the glass gob by means of the scoop funnel towards the trough, and further includes guiding the glass gob by means of the trough towards the deflector funnel, and wherein depositing the glass gob in step c) includes depositing the glass gob by means of the deflector funnel in the opening of the mould, wherein controlling, in step e), of guiding as in step b) of the next glass gob includes adjusting a mutual position of at least two of the scoop funnel, the trough, and the deflector funnel. Adjusting, based on the glass gob observation result, the mutual position of the at least two of the scoop funnel, the trough, and the deflector funnel enables improved process control of guiding as in step b) of the next glass gob. For example, a resistance for the next glass gob at the transition from the scoop funnel to the trough can be changed, preferably decreased, by adjusting the mutual position of the scoop funnel and the trough. For example, a resistance for the next glass gob at the transition from the trough to the deflector funnel can be changed, preferably decreased, by adjusting the mutual position of the trough and the deflector funnel.

It may be clear that controlling deposition of the next glass gob in step a) and controlling guiding the next glass gob in step b) add to minimizing loss of glass gob velocity when the next glass gob travels through the delivery system.

In an embodiment, predicting in step e) includes comparing the glass gob velocity with a previous glass gob velocity of a previous glass gob that is formed earlier than the glass gob, wherein a difference between the predicted glass distribution in the mould and a previous glass distribution in the mould of the previous glass gob, depends on a difference between the glass gob velocity and the previous glass gob velocity. The predetermined relation and/or the input of the self-learning algorithm may be based on the previous glass gob velocity and/or on the previous glass gob distribution in the mould.

In an embodiment, controlling, in step e), of depositing as in step a) of the next glass gob includes adjusting air supply to an accelerator for the next glass gob, which accelerator is positioned before the inlet. The accelerator may be arranged for increasing the magnitude of the glass gob velocity before it enters the inlet. Therefore, this embodiment enables an efficient way of adjusting the velocity of the next glass gob.

In an embodiment, the method includes repeating steps a)-e) for a plurality of glass gobs, wherein predicting in step e) includes comparing between the plurality of glass gobs the glass gob observation result determined in step e). Comparing may be between glass gobs deposited at different positions, preferably from different deflector funnels. Such process control supports uniformity of glass products made from the glass gobs. Alternatively or additionally, comparing may be between glass gobs deposited at the same position, preferable from the one of the scoop funnels. This supports the process control in that differences, for example changes in time, in the glass gob observation result can be detected from one glass gob to another glass gob.

In an embodiment, the glass gob is substantially made of inorganic material such as silicon oxide.

More in general, it may apply that the method relates to a first step of observing the glass gob, at at least one moment and/or during at least one period after the glass gob has passed the inlet of the delivery system, by using an optical imaging device; and to a second step of determining, based on the observing in the first step, a glass gob observation result that includes a glass gob velocity, for predicting, based on at least the glass gob velocity of the glass gob observation result, a glass distribution of the glass product formed in the mould, and/or for controlling a next glass gob that is formed later than the glass gob.

It is another object of the invention to provide a system of an optical imaging device and an apparatus for filling a mould with a glass gob, that enables an improved process control.

Thereto the invention provides a system comprising an optical imaging device, a signal processing unit coupled to the imaging device, and an apparatus for filling a mould with a glass gob through an opening of the mould, for forming a glass product in the mould, the apparatus having a delivery system for delivering the glass gob to the opening of the mould, the delivery system having an inlet, an outlet, and guiding means for guiding the glass gob through the delivery system towards the outlet of the delivery system, wherein the optical imaging device is arranged for generating a signal representing an image of the glass gob at at least one moment and/or during at least one period, after the glass gob has passed the inlet of the delivery system, wherein the signal processing unit is arranged for determining, based on the signal representing the image, a glass gob observation result that includes a glass gob velocity, and wherein the signal processing unit is arranged for predicting, based on at least the glass gob velocity of the glass gob observation result, a glass distribution of the glass product formed in the mould, and/or for generating a control signal for the apparatus for controlling, based on at least the glass gob velocity of the glass gob observation result, depositing a next glass gob in the inlet of the delivery system, guiding the next glass gob towards the outlet of the delivery system, and/or depositing the next glass gob from the outlet of the delivery system in the opening of the mould. Deviation of the glass gob velocity, or equivalently a parameter representative therefore, from a predetermined value is a good indicator for loss of quality of the glass product, for example the degree of inclusion of gas in the glass product and/or a deviation of the external shape of the glass product from a predetermined external shape. As the system is arranged for determining the glass gob velocity, it enables an improved process control.

In an embodiment, predicting the glass distribution includes predicting an internal structure and/or an external shape of the glass product formed in the mould. Preferably, predicting the internal structure includes predicting a degree of inclusion of gas in the glass product and/or predicting the external shape includes predicting a deviation of the external shape of the glass product from a predetermined external shape. These methods of predicting may be based on a magnitude of the glass gob velocity and/or a direction of the glass gob velocity.

Preferably, the apparatus has a mould holder for holding the mould below the outlet.

In an embodiment, the optical imaging device includes at least two cameras, each camera having an optical axis, wherein in use the optical axes of the at least two cameras have mutually distinct directions, preferably mutually transverse directions. The use of at least two camera enables determining the glass gob velocity in three dimensions.

Preferably, in use the optical axes of the at least two cameras are directed transverse to a travel path of the glass gob from the outlet to the opening of the mould.

In an aspect of the invention, the glass gob observation result associated with the method of filling the mould with the glass gob and/or associated with the system comprising the optical imaging device and the apparatus for filling the mould with the glass gob, includes a temperature and/or a temperature distribution of the glass gob. The temperature and/or the temperature distribution may be determined by using one or at least two infrared cameras, which may be included by the optical imaging device. Such infrared cameras may be arranged for measuring radiant energy of the glass gob, which can be related to the temperature and/or the temperature distribution of the glass gob. The temperature and/or the temperature distribution may be related to substantially the whole volume of the glass gob, or to a near-surface region of the glass gob. The temperature and/or the temperature distribution strongly influences the viscosity of liquid material forming the glass gob, which is an important parameter for filling the mould. The temperature and/or the temperature distribution may deviate from a desired temperature or temperature distribution, for example as a result of changes in time of processes during formation of the glass gob, or as a result of changes in time of heat loss of the glass gob towards the guiding means. Such heat loss in general depends on the friction of the guiding means, which friction may change in time. Determining the near-surface temperature and/or near-surface temperature distribution using the one or at least two infrared cameras forms an efficient way of measuring, as the near-surface temperature and/or near-surface temperature distribution is most vulnerable for undesired cooling, for example as a result of the heat loss. In addition, measuring the near-surface temperature offers the surprising advantage that it provides important information for assessing the friction of the glass gob with the inner wall of the mould. As the viscosity of the liquid material forming the glass gob is strongly dependent on temperature, the near-surface temperature of the glass gob largely determines the viscosity near the surface, and thus the friction of the glass gob with the inner wall of the mould. Such friction is important for the glass gob to travel far enough into the mould, and for the occurrence of air inclusion in the glass product. Both of these are negatively influence by the friction being too large. Use of the one or at least two infrared cameras in general shows the advantage of contactless temperature measurement.

As the temperature and/or the temperature distribution, and the glass gob velocity are important for predicting the glass distribution in the mould, the inventor recognised the value of determining, based on the observing in step d), a glass gob observation result that includes a glass gob velocity and a glass gob temperature and/or glass gob temperature distribution, for predicting, based on at least the glass gob velocity and the glass gob temperature and/or glass gob temperature distribution of the glass gob observation result, a glass distribution of the glass product formed in the mould, and/or for controlling, based on at least the glass gob velocity and the glass gob temperature and/or glass gob temperature distribution of the glass gob observation result, depositing as in step a), guiding as in step b), and/or depositing as in step c), of a next glass gob that is formed later than the glass gob. Such a combination of at the one hand the glass gob velocity and on the other hand the glass gob temperature and/or the glass gob temperature distribution, enables an improved predicting of the glass distribution and/or improved controlling of the next glass gob.

However, based on the above, the inventor also recognized the importance of carrying out step d) and determining, based on the observing in step d) a glass gob observation result that includes a glass gob temperature and/or a glass gob temperature distribution, preferably by using one or at least two infrared cameras, without necessarily carrying out step a), b), and/or determining, based on the observing in step d), a glass gob observation result that includes a glass gob velocity, for predicting, based on at least the glass gob velocity of the glass gob observation result, a glass distribution of the glass product formed in the mould, and/or for controlling, based on at least the glass gob velocity of the glass gob observation result, depositing as in step a), guiding as in step b), and/or depositing as in step c), of a next glass gob that is formed later than the glass gob.

BRIEF DESCRIPTION OF THE SEVERAL VIEWS OF THE DRAWINGS

The invention will now be described, in a non-limiting way, with reference to the accompanying drawings, in which.

DETAILED DESCRIPTION OF THE INVENTION

Unless stated otherwise, the same reference numbers refer to like components throughout the drawings.

Figure 1A:
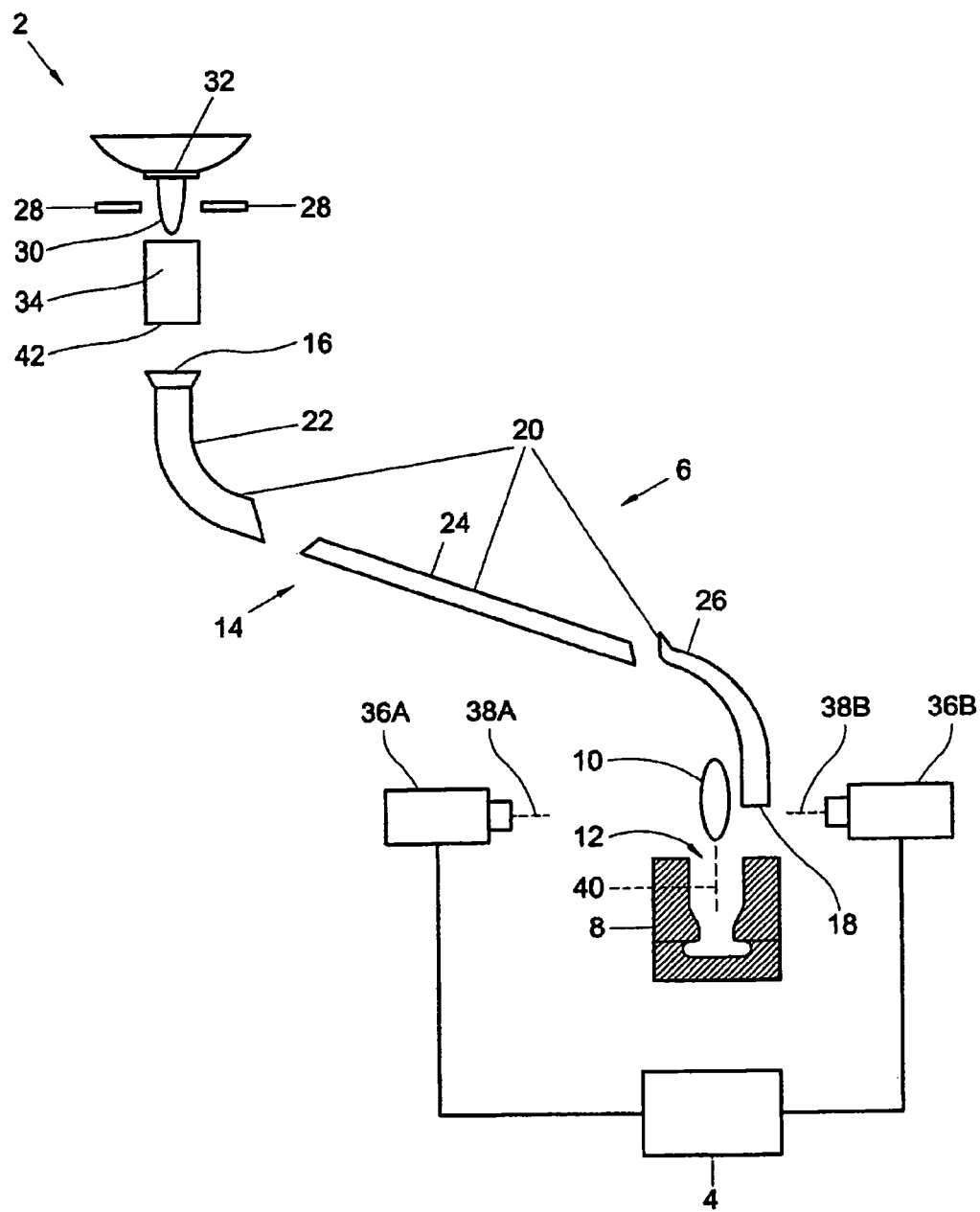
FIG. 1A shows a system in a first embodiment according to the invention.

FIG. 1A shows a system 2 in a first embodiment according to the invention. The system 2 comprises an optical imaging device 4, and an apparatus 6 for filling a mould 8 with a glass gob 10 through an opening 12 of the mould 8. The apparatus 6, and the system 2, are arranged for forming a glass product in the mould, for example a bottle. The apparatus 6 as such is known to the skilled person. The glass gob 10 may be substantially made of inorganic material such as silicon oxide.

The apparatus 6 has a delivery system 14 for the glass gob 10. The delivery system has an inlet 16, an outlet 18, and guiding means 20 for guiding the glass gob 10 through the delivery system 14 towards the outlet 18 of the delivery system 14. In the first embodiment, the guiding means 20 include a scoop funnel 22 that forms the inlet 16. In addition, the system 2 may include a trough 24 and a deflector funnel 26 that forms the outlet 18. For formation of the glass gob 10, the apparatus 6 further may include a pair of shear blades 28 to detach the glass gob 10 from a glass column 30 pushed out of a reservoir of liquid glass through an orifice 32. The apparatus 6 may further include an accelerator 34 for accelerating the formed glass gob. Such an accelerator may accelerate the glass gob by applying air pressure on the glass gob. In addition, the accelerator in use may centralizes the glass gob. The accelerator as such is known to the skilled person.

Figure 1B:
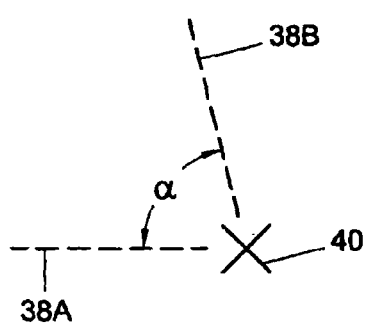
FIG. 1B shows a first and a second optical axis in a first plane perpendicular to a travel path of a glass gob.
Figure 1C:
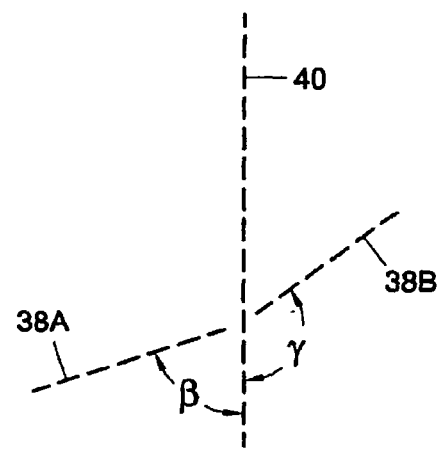
FIG. 1C shows a first and a second optical axis in a second plane parallel with a travel path of a glass gob.

The optical imaging device 4 may include at least two cameras, in this example a first camera 36A and a second camera 36B. The first and/or second camera may for example be a CMOS (complementary metal-oxide-semiconductor) camera or a CCD (charge coupled device) camera, both known as such to the skilled person. The optical imaging device 4 may be arranged for generating a signal representing images of the glass gob 10, for example obtained by the first and second camera 36A, 36B. Thereto the imaging device 4 may include a processor. The first and second camera 36A, 36B individually may have respectively a first optical axis 38A and a second optical axis 38B. FIGS. 1B and 1C illustrate possible orientation of the first and second optical axis 38A, 38B with respect to a travel path 40 of the glass gob 10. In use, the first and second optical axis 38A, 38B may have mutually distinct directions.

FIG. 1B shows the first and the second optical axis 38A, 38B in a first plane perpendicular to the travel path 40 of the glass gob 10. The first and second optical axis preferably have mutually transverse directions. For example, in the first plane, a first angle $\alpha$ between the first and second optical axis is larger than 20 degrees and smaller than 340 degrees. Preferably, the first angle $\alpha$ is near 90 degrees or near 270 degrees. As a result, the first and second optical axis may have mutually perpendicular directions.

FIG. 1C shows the first and the second optical axis 38A, 38B in a second plane parallel with the travel path 40 of the glass gob 10. The first optical axis preferably is transverse to the travel path 40. For example, in the second plane, a second angle $\beta$ between the first optical axis 38A and the travel path 40 is larger than 20 degrees and smaller than 160 degrees. The second optical axis preferably is transverse to the travel path 40. For example, in the second plane, a third angle $\gamma$ between the second optical axis 38B and the travel path 40 is larger than 20 degrees and smaller than 160 degrees.

With reference to FIGS. 1A-C there will be described a method of filling a mould with a glass gob, in a first embodiment according to the invention (hereafter referred to as the first method). The method is arranged for filling the mould 8 with the glass gob 10 through the opening 12 of the mould 8, for obtaining the glass product. The method includes using the delivery system 14 for delivering the glass gob 10 to the opening 12 of the mould 8.

The first method includes depositing the glass gob 10 in the inlet 16 of the delivery system. Such depositing may include allowing the glass gob 10 to fall into the inlet 16 after formation of the glass gob 10. Depositing may also include aligning a glass gob formation position and the inlet.

The first method further includes guiding the glass gob 10 by using the guiding means 20 towards the outlet 18 of the delivery system 14. During guiding, the glass gob may accelerate under the influence of gravity. The shape of the glass gob 10 may change as well during guiding. Guiding may increase an elongation of the glass gob 10. A plurality of glass gobs 10 may be formed at one and the same formation position, while the glass gobs are guided towards mutually distinct positions in different moulds 8. In this way a plurality of glass products can be formed simultaneously. In this example, the orifice and/or shear blade positions can be regarded as the formation position at which the glass gob is formed. Alternatively, an opening 42 of the accelerator 34 may be regarded as the formation position.

The first method may further include depositing the glass gob 10 from the outlet of the delivery system 14 in the opening 12 of the mould 8. Such depositing may be obtained by allowing the glass gob 10 to fall freely into the opening 12 of the mould 8, after the glass gob has passed the outlet 18. Depositing may also include aligning the outlet and the opening 12 of the mould 8.

The first method further includes observing the glass gob 10 at at least one moment and/or during at least one period after the glass gob 10 has passed the inlet 16. For example, observing is carried out at a moment while the glass gob 10 is in the deflector funnel 26 or when the glass gob has partly passed the outlet 18. However, preferably observing the glass gob 10 is carried out at at least one moment and/or during at least one period after the glass gob 10 has completely passed the outlet 18 of the delivery system 2.

In general, observing may be continuous, i.e. each glass gob that passes the inlet 16 is observed. Alternatively, observing may be intermittent, i.e. the glass gobs may be sampled, so that not every glass gob that passes the inlet 16 is observed.

In the first method, observing may be carried out by using the optical imaging device 4, in this example including the first and second camera 36A, 36B. Observing may be carried out with the first and second optical axis 38A, 38B of respectively the first and second camera 36A, 36B having mutually distinct directions, preferably mutually transverse directions with the first angle α in a range from 20 to 160 degrees, optionally in a range from 50 to 130 degrees. Further, observing may be carried out with the second angle β and the third angle γ in a range from 20 degrees to 160 degrees, optionally in a range from 50 to 130 degrees. The first and second optical axis 38A, 38B are thus directed transverse to the travel path 40 of the glass gob 10.

In general, it is recognized by the inventor that it is advantageous to have, during observing, the second angle β and/or the third angle γ larger than 90 degrees, for example in a range from 110 to 170 degrees. This enables observation of the glass gob 10 in a downwardly inclined direction. As a result, observation is not hindered by a frame of the apparatus 6 and/or by the mould 8. In addition, such observation may be facilitated by the first angle α being smaller than 190 degrees, for example near 90 degrees, so that the first and second camera can be placed at the same side of the mould 8.

In general, observing the glass gob 10 may include recording an image, preferably at least two images at different times, of the glass gob 10, by using the optical imaging device 4. The image may be recorded at the at least one moment. The at least two images may be recorded during the at least one period. The first and second camera may be high-speed cameras. Such a high-speed camera as such is known to the skilled person. The high-speed camera may be able to record for example at least 500 images per second. However, in other variations, the image or images are not necessarily recorded by the first and second camera.

The first method further includes determining, based on the observing in step d), for example based on the recorded images and/or based on the signal representing the images, a glass gob observation result that includes a glass gob velocity. Thereto the system 2 may include a signal processing unit for calculating the glass gob velocity, for example from the recorded images. The signal processing unit is not shown in FIG. 1A, but is shown is FIG. 2 with reference number 44. Calculating the glass gob velocity may take into account the value of the first, second, and third angle. Methods and algorithms for such calculating are known as such to the skilled person, and a further description is deemed superfluous.

The first method may include using the determined velocity for predicting, based on at least the glass gob velocity of the glass gob observation result, a glass distribution of the glass product formed in the mould, for example an internal and/or external shape of the glass product formed in the mould 8. Such predicting may include predicting a degree of inclusion of gas in the glass product and/or predicting a deviation of the external shape of the glass product from a predetermined external shape. The predetermined internal and/or external shape is for example a shape within normal manufacturing specifications. Such manufacturing specifications may include, at various locations along the glass product, length dimensions of the glass product, such as an inner diameter and an outer diameter of a glass bottle. The manufacturing specifications may also include a maximum diameter of a gas bubble in the glass product and/or a maximum number of gas bubbles in the glass product, for example in a wall of the glass bottle. The maximum diameter and the maximum number of gas bubbles are examples of the degree of inclusion of gas in the glass product.

Figure 1D:
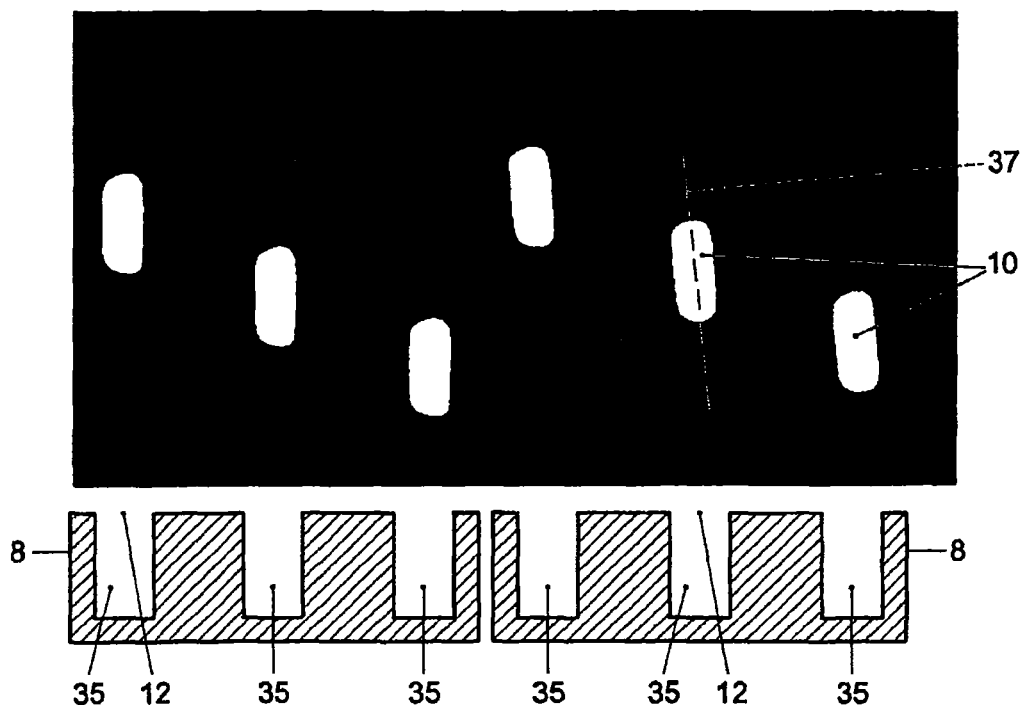
FIG. 1D shows a photo of glass gobs falling from an outlet towards an opening of a mould.

FIG. 1D shows a photo of glass gobs 10 falling from the outlet 18 towards the opening 12 of the mould 8, in this example two separate openings 12 of two separate moulds 8. In this example, the deflector funnel is one of a plurality of deflector funnels forming the outlet 18. Each opening 12 forms an entrance to three positions 35 of the mould 8 at which the glass product can be formed. The number of positions 35 contained by one mould 8 may be equal to the number of the plurality of deflector funnels contained by the delivery system.

A second method, in a second embodiment according to the invention, may include the steps of the first method. The second method is described with reference to FIGS. 1A-D. In the second method, the glass gob observation result further includes at least one of a group of variables including a glass gob trajectory, a glass gob shape, a change in the glass gob shape, a glass gob orientation, and a change in the glass gob orientation, for assessing the degree of inclusion of gas in the glass product and/or for assessing the deviation of the shape of the glass product from the predetermined shape. The glass gob 10 may have an elongated shape, so that the glass gob has a longitudinal axis 37 (FIG. 1D). Then, the orientation of the glass gob is determined by a direction of the longitudinal axis 37. The glass gob trajectory may be part of the travel path 40 of the glass gob 10. The change in the glass gob shape and/or the change in the glass gob orientation may refer to a change from one glass gob to a subsequent glass gob at substantially the same position, may refer to a change of one and the same glass gob, or may refer to a change from one glass gob to another glass gob at mutually different position, to be deposited at different part of the mould 8.

In general, the glass gob velocity is preferably determined in three dimensions, so that the glass gob velocity is a three-dimensional glass gob velocity. The glass gob trajectory may be a three-dimensional glass gob trajectory, the glass gob shape may be a three-dimensional glass gob shape, the change in the glass gob shape may be a change in the three-dimensional glass gob shape, the glass gob orientation may be a three-dimensional glass gob orientation, and the change in the glass gob orientation may be a change in the three-dimensional glass gob orientation. Such three-dimensional variables enable a more reliable process control.

In the second method, observing in step d) may be carried out before the glass gob 10 has entered the opening 12 of the mould 8. In addition, observing in step d) is carried out with the glass gob being positioned in proximity of the mould, for example within one, two, or three times a dimension of the glass gob. Such a dimension may be a length of the glass gob along the longitudinal axis. Observing the glass gob in proximity of the mould before the glass gob has entered the mould may give the user sufficient space for observation, while the observation is representative for the properties, such as the glass gob velocity, of the glass gob when it enters the mould.

Figure 2:
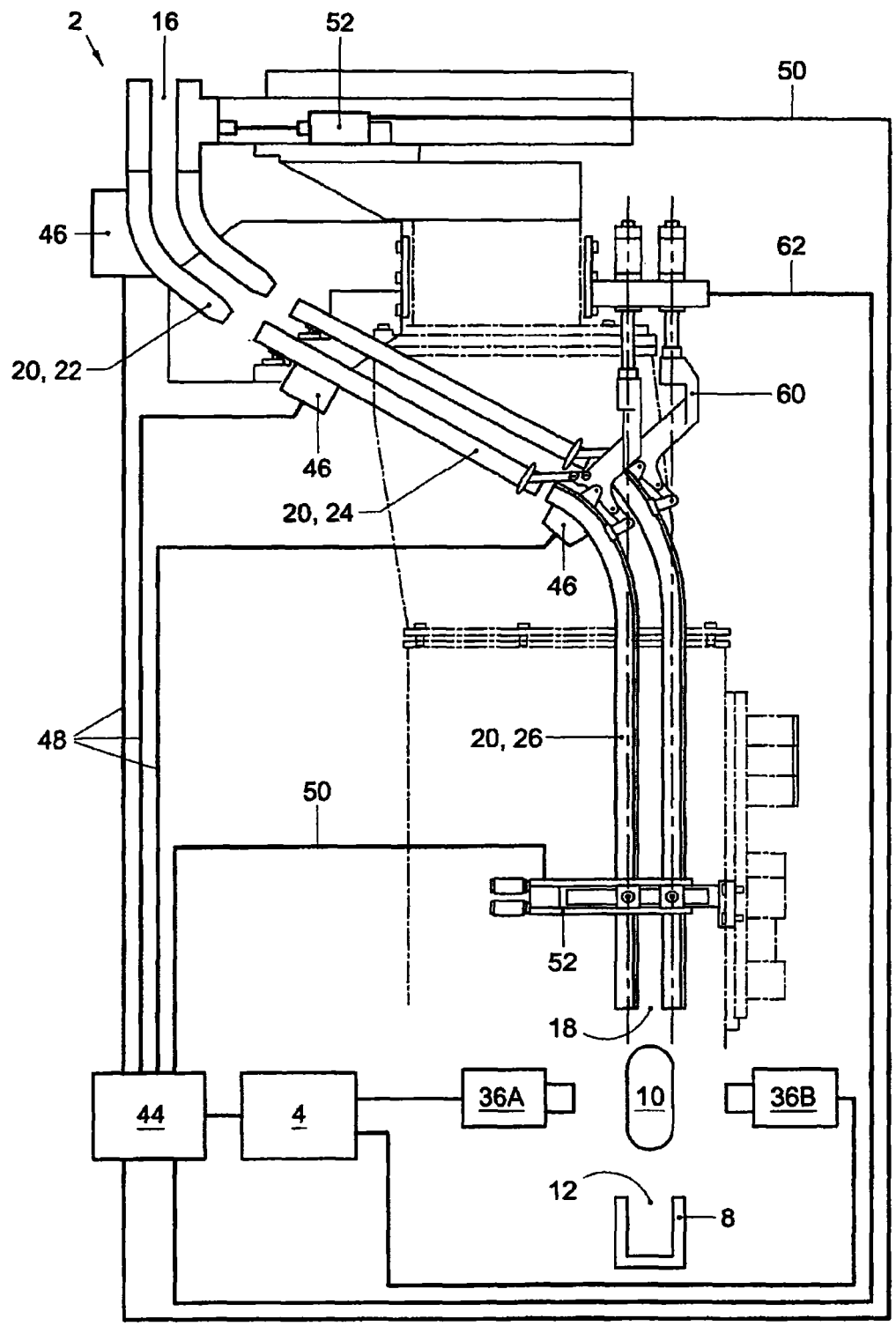
FIG. 2 shows a system in a second embodiment according to the invention.

FIG. 2 shows a system 2 in a second embodiment according to the invention. The system 2 in the second embodiment includes the scoop funnel 22, the trough 24, and the deflector funnel 26. The system 2 may further include the optical imaging device 4 and the signal processing unit 44. The optical imaging device 4 may be connected to the signal processing unit 44 for transmission of the signal representing the image from the optical imaging device 4 to the processing unit 44. The signal processing unit 44 may be arranged for predicting, based on at least the glass gob velocity, a glass distribution of the glass product formed in the mould.

The signal processing unit 44 may be arranged for generating a control signal for the apparatus for controlling, based on at least the glass gob velocity of the glass gob observation result, guiding the next glass gob. Such controlling may include adjusting lubrication of the guiding means, in this example the scoop funnel 22, the trough 24, and/or the deflector funnel 26. Thereto the system 2 may include lubrication means 46, that are in use controlled by the signal processing unit 44 via connections 48 through which the control signal for controlling guiding may be transmitted to the lubrication means 46. Hence, the first signal processing unit 44 may be coupled to the lubrication means 46 and the optical imaging device 4. The signal processing means 44 may be formed by a computer with, in use, controlling software and/or prediction software running thereon. Based on the glass gob observation result, the signal processing unit 44 in use may adjust the lubrication of the guiding means 20. For example, if the magnitude of the velocity of the glass gobs 10 decreases below a predetermined limit value, the signal processing unit 44 may give to the lubrication means 46 a command for dispensing lubricant onto the guiding means 20, so that a resistance of the glass gob 10 in the guiding means is decreased. As a general advantage, the system 2 enables automatic lubrication of the guiding means.

The signal processing unit 44 may be arranged for generating a control signal for the apparatus for controlling, based on at least the glass gob velocity of the glass gob observation result, depositing the next glass gob. Thereto the system 2 may include displacement means 52 coupled to the signal processing unit 44 via connections 50 through which the control signal for controlling depositing may be transmitted to the displacement means 52. Such controlling may include adjusting a mutual position difference of the inlet and a formation position at which the glass gob is formed by means of the displacement means 52. Alternatively or additionally, controlling may include adjusting a mutual position difference of the outlet 18 and the opening of the mould, by using the displacement means 52.

In general, the scoop funnel may be one of a plurality of scoop funnels. The trough may be one of a plurality of troughs. The deflector funnel may be one of the plurality of deflector funnels. Guiding the glass gob may include guiding the glass gob by means of the one of the scoop funnels towards the one of the troughs, and may further include guiding the glass gob by means of the one of the troughs towards one of the deflector funnels.

The system 2 may include adjustment means 60 coupled to the signal processing unit 44 via connections 62 through which the control signal for controlling guiding may be transmitted to the adjustment means 60. Controlling guiding the next glass gob may include adjusting a mutual position of at least two of the scoop funnel, the one of the troughs and the one of the deflector funnels by using the adjustment means. As a general advantage, the system 2 enables automatic adjustment of the guiding means 20.

The first and/or second method may include using the glass gob observation result for controlling forming of a next glass gob that is formed later than the glass gob 10. Such controlling may include adjustment of a moment at which the shear blades 28 cut the glass that flows out of the orifice 32, and/or adjustment of a force with which the shear blades cut the glass that flows out of the orifice 32. Alternatively or additionally, such controlling may include adjustment of a force and/or a velocity with which the glass is pushed out of the orifice 32.

The first and/or second method may include using the glass gob observation result for controlling, based on at least the glass gob velocity of the glass gob observation result, guiding the next glass gob, by using the guiding means, towards the outlet of the delivery system. This controlling may include adjusting lubrication of the guiding means. This can be achieved by using the signal processing unit 44 and the lubrication means 46 of the system 2 in the second embodiment.

In general, the first and/or second method may include aligning the optical imaging device 4, in particular the first and/or second camera 36A, 36B with respect to the mould. In this way, the direction of the glass gob velocity with respect to the mould, in particular the opening of the mould, can be inferred from the glass gob observation result.

The first and second method may include using the glass gob observation result for controlling, based on at least the glass gob velocity of the glass gob observation result, deposition of the next glass gob. This controlling may include adjusting a mutual position difference of the inlet 16 and a formation position at which the next glass gob is formed and/or includes adjusting a mutual position difference of the outlet 18 and the opening 12 of the mould 8. This can be achieved by using the signal processing unit 44 and the displacement means 52 of the system 2 in the second embodiment.

The first and second method may include using the glass gob observation result for controlling, based on at least the glass gob velocity of the glass gob observation result, guiding the next glass gob, by using the guiding means, towards the outlet of the delivery system. This controlling may include adjusting a mutual position of at least two of the one of the scoop funnels, the one of the troughs and the one of the deflector funnels. Adjusting the mutual position of the one of the troughs and the one of the deflector funnels can be achieved by using the signal processing unit 44 and the adjustment means of the system 2 in the second embodiment.

The first and/or second method may include determining the glass gob observation result for a plurality of glass gobs, and comparing between the plurality of glass gobs the glass gob observation results. Comparing may be between glass gobs deposited from one and the same outlet 18. This supports the process control in that differences, for example changes in time, in the glass gob observation result can be detected from one glass gob to another glass gob. If such changes are detected, process control may be applied, for example adjusting a mutual position difference of the inlet and the formation position at which the next glass gob is formed, adjusting a mutual position of at least two of the one of the scoop funnels, the one of the troughs, and the one of the deflector funnels by using the adjustment means, and/or adjusting lubrication of the guiding means.

The first and/or second method may be applied during production of the glass product, or during start-up and/or calibration of the apparatus 6.

Figure 3A:
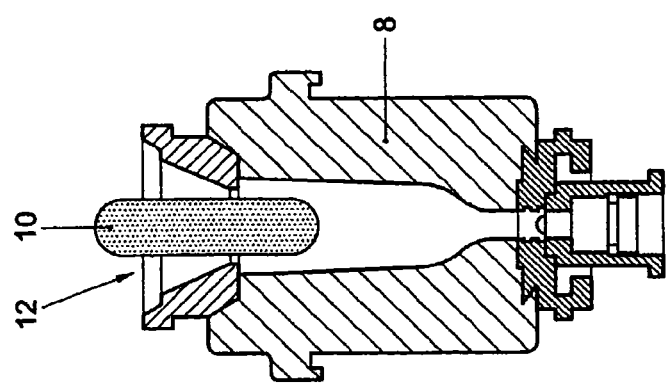
FIGS. 3A-F show subsequent stages of a process for forming a glass product.
Figure 3B:
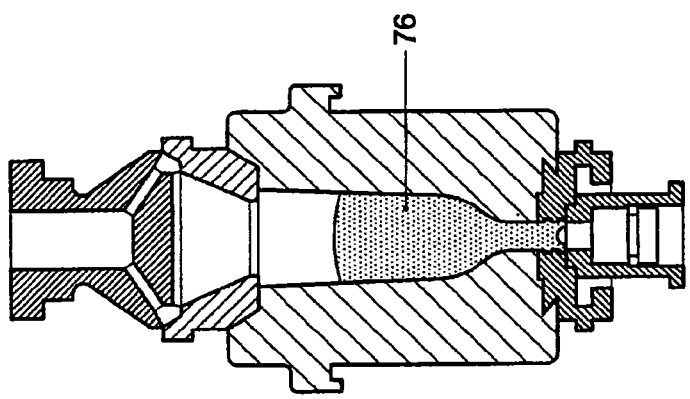
Figure 3C:
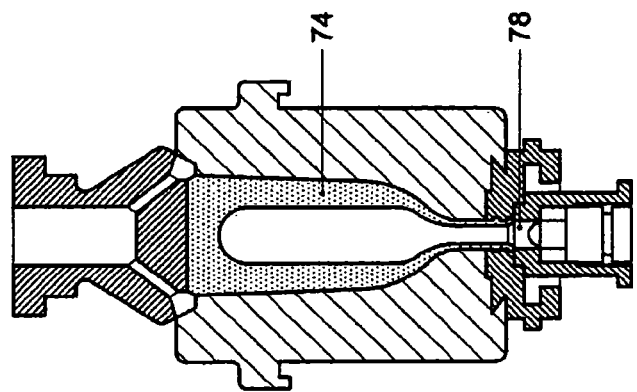
Figure 3F:
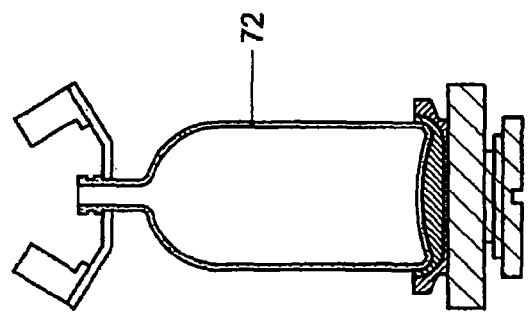
Figure 3E:
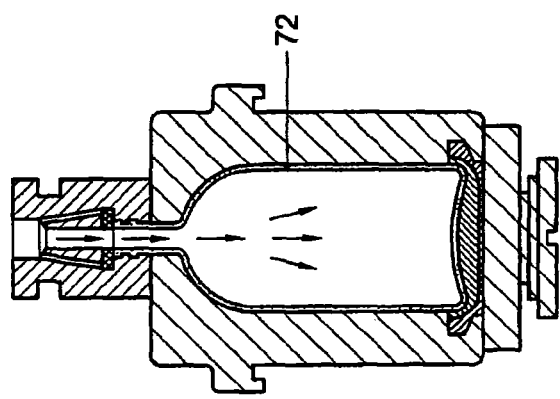
Figure 3D:
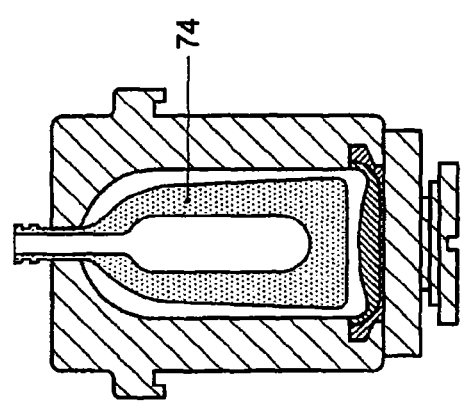

FIGS. 3A-F show subsequent stages of a process for forming the glass product, in this example the bottle 72 of FIGS. 3E and 3F. Another example of the glass product is for example the preform 74 of FIGS. 3C and 3D. FIG. 3A shows the glass gob 6 entering the mould 8 through the mould opening 12. FIG. 3B shows the glass material 76 of the glass gob 10 being blown downwards by using air pressure. FIG. 3C shows the glass of the glass gob 10 after air is blown upwards from air opening 78, thus forming the preform 74. In a subsequent step, the preform 74 is turned 180 degrees, in order to obtain an orientation of the preform 74 shown in FIG. 3D. By blowing air into the preform, the glass product 72 is obtained, as shown in FIG. 3E. After removing the mould 8, for example by separating and moving away a first part and a second part of the mould 8, the bottle 72 is obtained, as shown in FIG. 3F. In a method in a third embodiment according to the invention, these stages may be included.

Figure 4C:
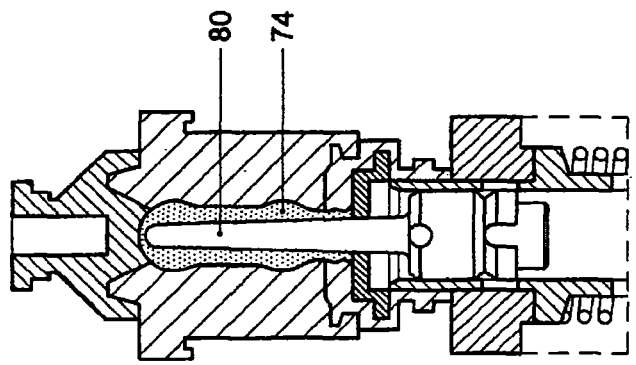
FIGS. 4A-G show subsequent stages of an alternative process of forming a glass product.
Figure 4B:
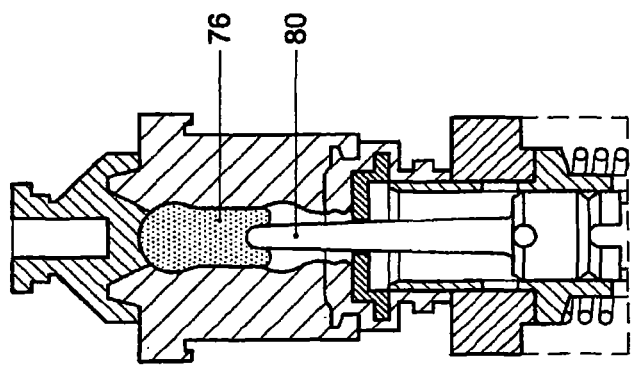
Figure 4A:
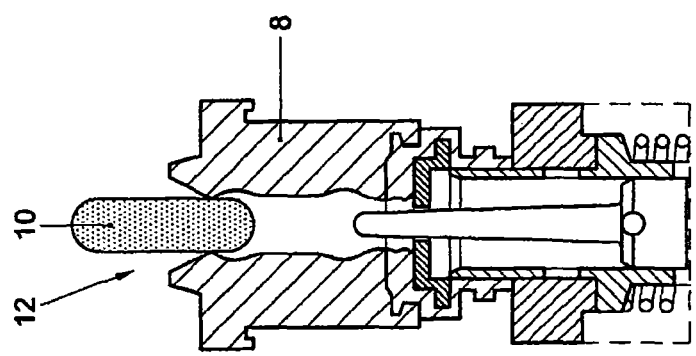
Figure 4D:
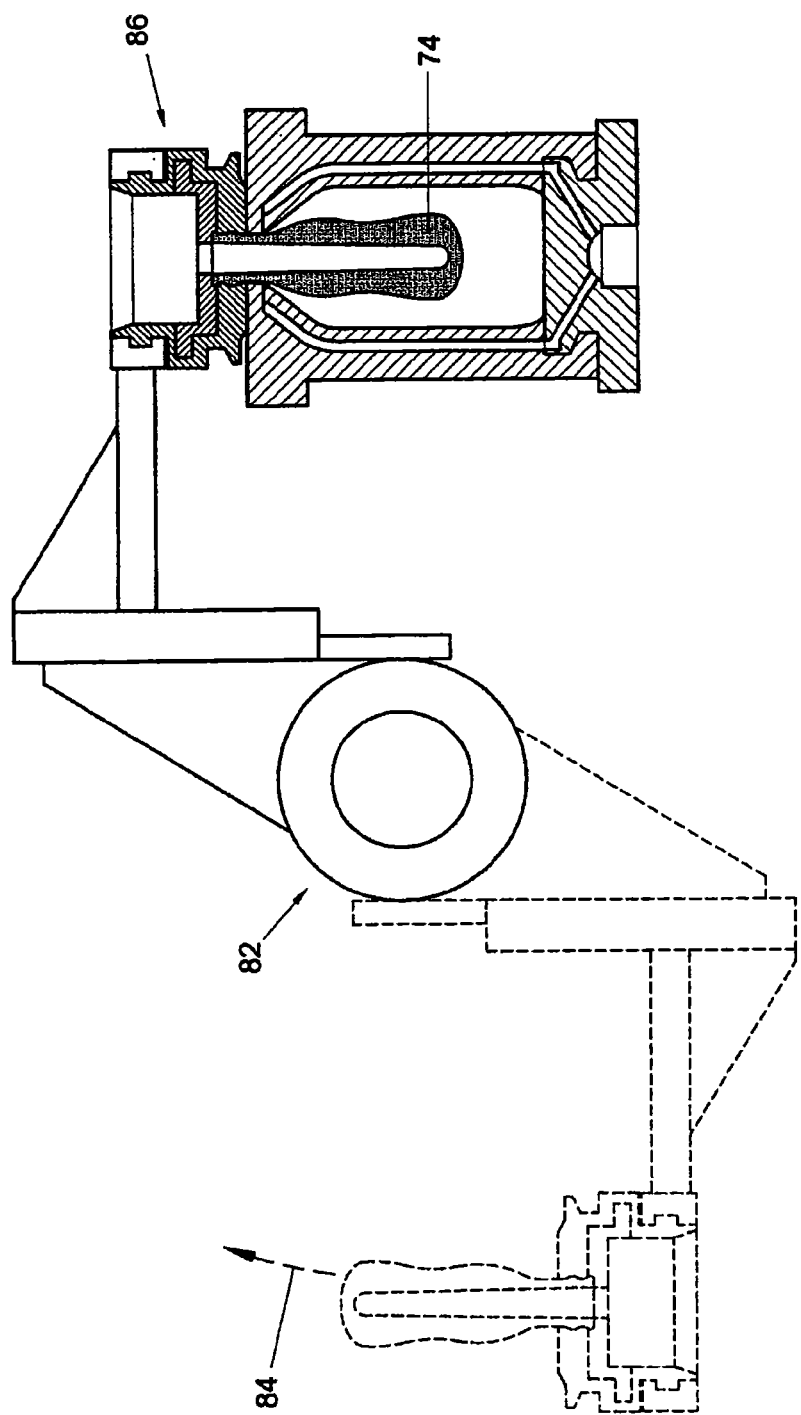
Figure 4E:
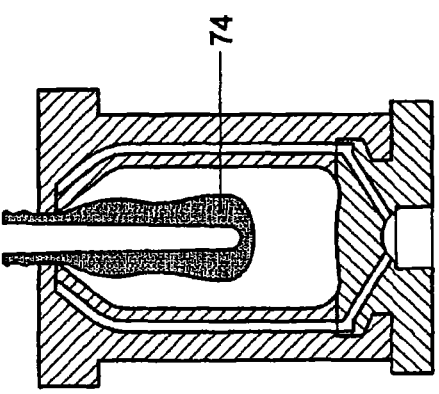
Figure 4F:
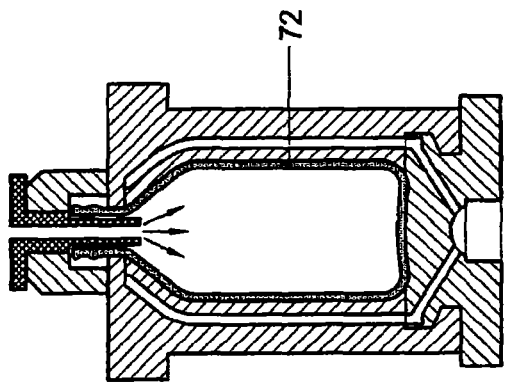
Figure 4G:
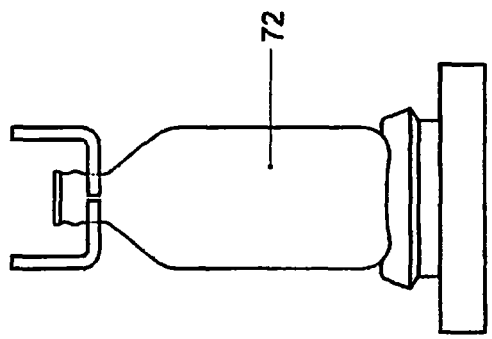

FIGS. 4A-G show subsequent stages of an alternative process of forming the glass product, in this example the glass bottle 72 or the preform 74. FIG. 4A shows the glass gob 6 entering the mould 8 through the mould opening 12. After entering, the opening 12 of the mould 8 may be closed and a moulding element 80 may be pushed into the material 76 of the glass gob 10, shown in FIGS. 4B and 4C. In this way the preform 74 may be manufactured. The preform 74 is subsequently inverted by using the inverter 82, along the arrow 84, as shown in FIG. 4D. A part 86 of the mould 8 may be removed, to expose the preform 74, as shown in FIG. 4E. After blowing air into the preform (FIG. 4F), the glass product, in this example the glass bottle 72, may be obtained after removing the mould 8 (FIG. 4G). In a method in a fourth embodiment according to the invention, these stages may be included.

Although also advantageous in the fourth method, determining the glass gob velocity for predicting the glass distribution in the mould and/or for controlling the next glass gob is even more advantageous in the third method. In the third method, the glass product is more sensitive to increased friction of the glass gob in the mould, as use of the moulding element 80 is missing in the third method.

The method in the first, second, third, or fourth embodiment may have a feature that is not described for that embodiment, but is described for another one of the first, second, third, or fourth embodiment. The invention is not limited to any embodiment herein described and, within the purview of the skilled person, modifications are possible which may be considered within the scope of the appended claims. Equally all kinematic inversions are considered inherently disclosed and to be within the scope of the present invention. The use of expressions like: "preferably", "in particular", "especially", etc. is not intended to limit the invention. The indefinite article "a" or "an" does not exclude a plurality.

Thus, although there have been described particular embodiments of the present invention of a new and useful Method of filling a mould, and system for filling a mould it is not intended that such references be construed as limitations upon the scope of this invention except as set forth in the following claims.

What is claimed is:

1. Method of filling a mould with a glass gob through an opening of the mould, for forming a glass product in the mould, by using a delivery system for delivering the glass gob to the opening of the mould, the delivery system having an inlet, an outlet, and guiding means including at least one of a funnel or a trough for guiding the glass gob through the delivery system, the method including the steps:
   a) depositing the glass gob in the inlet of the delivery system;
   b) guiding the glass gob by using the guiding means towards the outlet of the delivery system;
   c) depositing the glass gob from the outlet of the delivery system in the opening of the mould;
   d) observing the glass gob, at at least one moment and/or during at least one period after the glass gob has passed the inlet of the delivery system, by using an optical imaging device;
   e1) determining, based on the observing in step d), a glass gob observation result that includes a glass gob velocity, for; and
   e.2) controlling, using a predetermined relation between glass gob velocity and a distribution of the glass product formed in the mould according to at least the glass gob velocity of the glass gob observation result, at least one of the depositing as in step a), the guiding as in step b), or the depositing as in step c), of a next glass gob that is formed later than the glass gob, wherein the glass gob observation result further includes a group of variables including a glass gob trajectory, a glass gob shape and a glass gob orientation wherein controlling in step e) is further based on these variables.

2. Method according to claim 1, wherein the glass gob velocity includes a magnitude of the glass gob velocity.

3. Method according to claim 1, wherein the glass gob velocity includes a direction of the glass gob velocity.

4. Method according to claim 1, wherein the glass gob observation result further includes at least one of a second group of variables including a change in the glass gob shape, and a change in the glass gob orientation, and wherein controlling in step e) is further based on the at least one variable of the second group.

5. Method according to claim 1, wherein observing in step d) is carried out at at least one moment and/or during at least one period after the glass gob has, at least partly and optionally completely, passed the outlet of the delivery system.

6. Method according to claim 1, wherein observing in step d) is carried out at at least one moment and/or during at least one period after the glass gob has, at least partly, entered the opening of the mould.

7. Method according to claim 1, wherein the optical imaging device includes at least two cameras, each camera having an optical axis, wherein observing in step d) is carried out with the optical axes of the at least two cameras having mutually distinct directions, preferably mutually transverse directions.

8. Method according to claim 1, wherein the glass gob velocity is a three-dimensional glass gob velocity.

9. Method according to claim 1, including the steps:
f) forming the glass gob, by detaching the glass gob from a liquid glass reservoir; and
g) using the glass gob observation result for controlling forming the next glass gob that is formed later than the glass gob formed in step f).

10. Method according to claim 9, wherein controlling in step g) is based on at least the glass gob velocity of the glass gob observation result.

11. Method according to claim 1, wherein controlling, in step e), of guiding as in step b) of the next glass gob includes adjusting lubrication of the guiding means.

12. Method according to claim 1, wherein controlling, in step e), of depositing as in step a) of the next glass gob includes adjusting a mutual position difference of the inlet and a formation position at which the glass gob is formed.

13. Method according to claim 1, wherein controlling, in step e), of depositing as in step c) of the next glass gob includes adjusting a mutual position difference of the outlet and the opening of the mould.

14. Method according to claim 1, wherein the guiding means include a scoop funnel forming the inlet, a trough, and a deflector funnel forming the outlet, wherein guiding the glass gob in step b) includes guiding the glass gob by means of the scoop funnel towards the trough, and further includes guiding the glass gob by means of the trough towards the deflector funnel, and wherein depositing the glass gob in step c) includes depositing the glass gob by means of the deflector funnel in the opening of the mould, wherein controlling, in step e), of guiding as in step b) of the next glass gob includes adjusting a mutual position of at least two of the scoop funnel, the trough, and the deflector funnel.

15. Method according to claim 1, wherein controlling, in step e), of depositing as in step a) of the next glass gob includes adjusting air supply to an accelerator for the next glass gob, which accelerator is positioned before the inlet.

16. Method according to claim 1, including repeating steps a)-e) for a plurality of glass gobs.

* * * * *